(12) United States Patent
Shibata

(10) Patent No.: US 6,424,103 B2
(45) Date of Patent: Jul. 23, 2002

(54) DEFLECTION-DISTORTION CORRECTING CIRCUIT

(75) Inventor: Tatsuo Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/729,170

(22) Filed: Dec. 5, 2000

(30) Foreign Application Priority Data

May 25, 2000 (JP) ........................................ 2000-154070

(51) Int. Cl.[7] ................................................ G09G 1/04
(52) U.S. Cl. ........................ 315/370; 315/371; 348/807
(58) Field of Search ................................. 315/371, 370, 315/364; 348/807, 806, 805, 637

(56) References Cited

U.S. PATENT DOCUMENTS

| 5,272,421 | A | * | 12/1993 | Kimura et al. | 315/367 |
| 5,475,286 | A | * | 12/1995 | Jackson et al. | 315/371 |
| 5,656,894 | A | * | 8/1997 | Murakami et al. | 315/371 |
| 5,969,486 | A | * | 10/1999 | Webb et al. | 315/370 |
| 6,091,213 | A | * | 7/2000 | Park | 315/370 |

FOREIGN PATENT DOCUMENTS

JP          05328163      12/1993

* cited by examiner

Primary Examiner—Haissa Philogene
Assistant Examiner—Ephrem Alemu
(74) Attorney, Agent, or Firm—Birch, Stewart, Kolasch & Birch

(57) ABSTRACT

A deflection-distortion correcting circuit for correcting deflection-distortion of an image on a screen by modulating a source voltage for horizontal deflection is disclosed. The deflection-distortion correcting circuit includes a first correcting data generating unit for generating a first correcting data for an image display period, a second correcting data generating unit for generating a second correcting data for a vertical blanking period, deflection-distortion correcting signal generating unit for generating a correcting signal for the image display period and the vertical blanking period in accordance with the first and second correcting data, and a horizontal-deflection circuit which modulates a source voltage for horizontal deflection with the correcting signal. The second correcting data generating unit generates the second correcting data such that the correcting signal has a value, at a start of a vertical blanking period, which is equal to a value of the correcting signal at an end of an image display period, and that the correcting signal varies monotonically during the whole period of the vertical blanking period and reaches, at an end of the vertical blanking period, a value at a start of the image display period.

5 Claims, 10 Drawing Sheets

VERTICAL BLANKING PERIOD    IMAGE DISPLAY PERIOD

VERTICAL BLANKING PERIOD    IMAGE DISPLAY PERIOD

DEFLECTION-DISTORTION CORRECTING CIRCUIT

FIELD OF THE INVENTION

The present invention relates to a circuit for correcting distortion of an image on a screen in an image displaying apparatus having a cathode-ray tube, such as a display monitor.

BACKGROUND OF THE INVENTION

In an image displaying apparatus having a cathode-ray tube, such as a display monitor, an image produced on a screen through deflection of an electron beam has distortion (referred to as "deflection-distortion" hereinafter) depending on the form of the cathode-ray tube etc. Therefore, a deflection-distortion correcting circuit that generates a deflection-distortion correcting signal is used to adjust the extent of deflection and correct the deflection-distortion of an image on a screen. The above-described deflection-distortion correcting signal is generated by an analog circuit, however, it is not necessarily possible to obtain a deflection-distortion correcting signal having the desired accuracy. Accordingly, with the aim of improving the accuracy of such a deflection-distortion correcting signal, a deflection-distortion correcting circuit has been proposed that generates a deflection-distortion correcting signal based on digital data.

FIG. 10 is a block diagram of such a deflection-distortion correcting circuit. The deflection-distortion correcting circuit shown in FIG. 10, described in Japanese Unexamined Patent Publication No. 5-328163, generates a deflection-distortion correcting signal on the basis of digital data. In FIG. 10, there is shown a horizontal-deflection circuit 5, a horizontal-deflection power supplying circuit 6 of the series type, a horizontal-deflection current output circuit 7, a horizontal-deflection coil 8, a deflection-distortion .correcting circuit 21, a period-discriminating circuit 22, a period/N-generating circuit 23, an output-level control circuit 24, a counter circuit 25, a D/A conversion circuit 26, and an inverting/amplifying circuit 27.

The operation of the above deflection-distortion correcting circuit 21 shown in FIG. 10 will be explained below. The counter circuit 25 is reset by level change of a vertical synchronizing signal, and starts a count of clock pulses produced by frequency-dividing a reference clock in the period/N-generating circuit 23. The count data (digital data) of the counter circuit 25 is converted into an analog signal by the D/A conversion circuit 26, inverted in signal polarity by the inverting/amplifying circuit 27 as necessary, and is adjusted in signal amplitude (Here, it is assumed that the signal polarity is not inverted, and the analog signal output from the inverting/amplifying circuit 27 increases linearly). The analog signal which is generated from this digital data and increases linearly is output from the deflection-distortion correcting circuit 21 to the horizontal-deflection power supplying circuit 6 as a deflection-distortion correcting signal.

The horizontal-deflection power supplying circuit 6 has an internal structure as shown in FIG. 2. The source voltage $V_{out}$ which the horizontal-deflection power supplying circuit 6 supplies to the horizontal-deflection current output circuit 7 is modulated by the deflection-distortion correcting signal $S_b$ input from the deflection-distortion correcting circuit 21. The horizontal-deflection current output circuit 7 generates a horizontal-deflection current using the voltage $V_{out}$ modulated by the deflection-distortion correcting signal $S_b$ as its electric power, and supplies it to the coil 8. The coil 8 generates a horizontal-deflection magnetic field according to the supplied horizontal-deflection current. The envelope characteristic of the peak values of the above-described horizontal-deflection current varies according to the modulated source voltage $V_{out}$. Thus, deflection-distortion in that a monitor screen is distorted to a trapezoidal shape can be corrected.

FIG. 11(a) shows a waveform of the deflection-distortion correcting signal $S_b$ generated by the deflection-distortion correcting circuit 21 of FIG. 10, and the source voltage $V_{out}$ modulated by this deflection-distortion correcting signal $S_b$. FIG. 11(b) shows a waveform of the deflection-distortion correcting signal $S_b$ generated by the deflection-distortion correcting circuit 21, and the source voltage $V_{out}$ modulated by this deflection-distortion correcting signal $S_b$, in a case where a vertical blanking signal is used instead of the vertical synchronizing signal in FIG. 10. The vertical blanking signal is a signal whose level during an image display period (including horizontal blanking periods) over which a video signal exists is different from that during a vertical blanking period over which no image signal exists, to enable detecting a vertical blanking period. FIG. 11(c) shows a monitor screen corrected by the source voltage $V_{out}$ modulated by the deflection-distortion correcting signal $S_b$ of FIG. 11(a) or 11(b). In FIG. 11(a) and FIG. 11(b), the dotted line represents a waveform of the deflection-distortion correcting signal $S_b$ which increases linearly, and the source voltage $V_{out}$ modulated normally by this deflection-distortion correcting signal, and the solid line represents a waveform of the source voltage $V_{out}$ distorted by parasitic inductance in the horizontal-deflection power supplying circuit 6. In FIG. 11(c), the chain line represents a monitor screen distorted to a trapezoidal shape before correction, the dotted line represents a monitor screen corrected by the source voltage modulated normally, and the solid line represents a monitor screen corrected by the distorted source voltage.

If the source voltage $V_{out}$ is normally modulated as shown by the dotted line in FIG. 11(a) in the horizontal-deflection power supplying circuit 6 according to the deflection-distortion correcting signal $S_b$ which increases linearly, the monitor screen distorted to the trapezoidal shape as shown by the chain line in FIG. 11(c) is corrected normally as shown by the dotted line in FIG. 11(c).

However, the above-described conventional deflection-distortion correcting circuit involves a problem, which will be explained below.

FIG. 12 is an equivalent circuit diagram of the power supplying circuit 6 of the series type in a case where parasitic inductance is not negligible. In FIG. 12, the reference numerals identical to those in FIG. 2 represent the same elements. The horizontal-deflection power supplying circuit 6 of FIG. 12 differs from the horizontal-deflection power supplying circuit 6 of FIG. 2 in that an inductive load 30 appears between an emitter electrode of a transistor 16 and an output terminal of the source voltage $V_{out}$ due to the parasitic inductance. Although inductance components (parasitic inductance) of capacitors 18 and 19 and a wiring pattern are negligible for a low frequency signal, they are not negligible for a high frequency signal, and therefore, the inductive load 30 appears as shown in FIG. 12.

In the deflection-distortion correcting circuit 21 of FIG. 10, the moment the counter circuit 25 is reset by the vertical synchronizing signal, the digital data changes instantaneously from the maximum value to the minimum value, and therefore the deflection-distortion correcting signal as well changes instantaneously from the maximum value to the minimum value. Accordingly, the deflection-distortion correcting signal includes a high frequency component. When the deflection-distortion correcting signal having such a high frequency component is input into the horizontal-deflection power supplying circuit 6, the above-described inductance component in the horizontal-deflection power supplying circuit 6 cannot be neglected, and the inductive load 30 appears as a factor in the horizontal-deflection power supplying circuit 6 as shown in FIG. 12.

When the inductive load 30 appears, the source voltage $V_{out}$ for horizontal deflection is not normally modulated according to the deflection-distortion correcting signal $S_b$, and consequently, it has a distorted waveform as shown by the solid line in FIG. 11(a) which includes phase delay, reflection, ringing, etc. The monitor screen corrected by such a distorted source voltage $V_{out}$ will have abnormal curves and distortion ranging from the upper part to the middle part thereof as shown by the solid line in FIG. 11(c).

In the deflection-distortion correcting circuit 21 of FIG. 10, in a case where the counter circuit 25 is arranged to be reset, not by the vertical synchronizing signal, but by a vertical blanking signal having a pulse width larger than the vertical synchronizing signal as soon as an image display period terminates, the deflection-distortion correcting signal $S_b$ stays at the minimum value, during a blanking period, and increases linearly during an image display period. The level of the above-described vertical blanking signal during an image display period (including horizontal blanking periods) over which a video signal exists is different from that during a vertical blanking period over which no image signal exists, to enable detecting a vertical blanking period. If the source voltage $V_{out}$ for horizontal deflection is normally modulated as shown by the dotted line in FIG. 11(b) by the deflection-distortion correcting signal $S_b$, the monitor screen distorted to a trapezoidal shape as shown by the chain line in FIG. 11(c) due to deflection-distortion is normally corrected as shown by the dotted line in FIG. 11(c). However, even if the counter circuit 25 is reset by a vertical blanking signal, the source voltage $V_{out}$ for horizontal deflection may have a distorted waveform as represented by the solid line in FIG. 11(b) which includes phase delay, reflection, ringing, etc. A monitor screen corrected by such a distorted source voltage $V_{out}$ will have abnormal curves and distortion ranging from the upper part to the middle part thereof as shown by the solid line in FIG. 11(c).

OBJECT AND SUMMARY OF THE INVENTION

As described above, in the conventional deflection-distortion correcting circuit, since the value of the deflection-distortion correcting signal $S_b$ changes from the maximum to the minimum abruptly, and consequently, the deflection-distortion correcting signal $S_b$ has a high frequency component, the source voltage $V_{out}$ for horizontal deflection modulated by this deflection-distortion correcting signal $S_b$ in the, horizontal-deflection power supplying circuit is easily affected by the parasitic inductance in the horizontal-deflection power supplying circuit 6, causing the problem that phase delay, reflection, ringing, etc. arise in the source voltage $V_{out}$, which brings abnormal curves and distortion to the screen.

The present invention has been made in order to solve the above-described problem with an object of providing a deflection-distortion correcting circuit that does not bring abnormal curves and distortion to a screen.

This object is achieved by a deflection-distortion correcting circuit for correcting deflection-distortion of an image by modulating a source voltage for horizontal deflection, said deflection-distortion correcting circuit comprising:

a first correcting data generator generating a first correcting data for an image display period;

a second correcting data generator generating a second correcting data for a vertical blanking period;

a deflection-distortion correcting signal generator generating a correcting signal for said image display period and said vertical blanking period in accordance with said first and second correcting data; and a modulator modulating said source voltage with said correcting signal, wherein, said second correcting data generator generates said second correcting data such that said correcting signal has a value, at a start of a vertical blanking period, which is equal to a value of said correcting signal at an end of an image display period, and that said correcting signal decreases or increases monotonously during the whole period of the vertical blanking period and reaches, at an end of the vertical blanking period, a value at a start of the image display period.

The second correcting data generator may generate said second correcting data such that said correcting signal varies linearly over the vertical blanking period.

The second correcting data generator may also generate said second correcting data such that said correcting signal varies along a monotonously decreasing or increasing curve of a second order or higher over the vertical blanking period.

The first correcting data generator may generate said first correcting data such that said correction signal is also a signal for correcting side-pin distortion of an image during the image display period.

The second correcting data generator can be a microcomputer, and said second correcting data for the vertical blanking period can be produced by an operation in said microcomputer.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
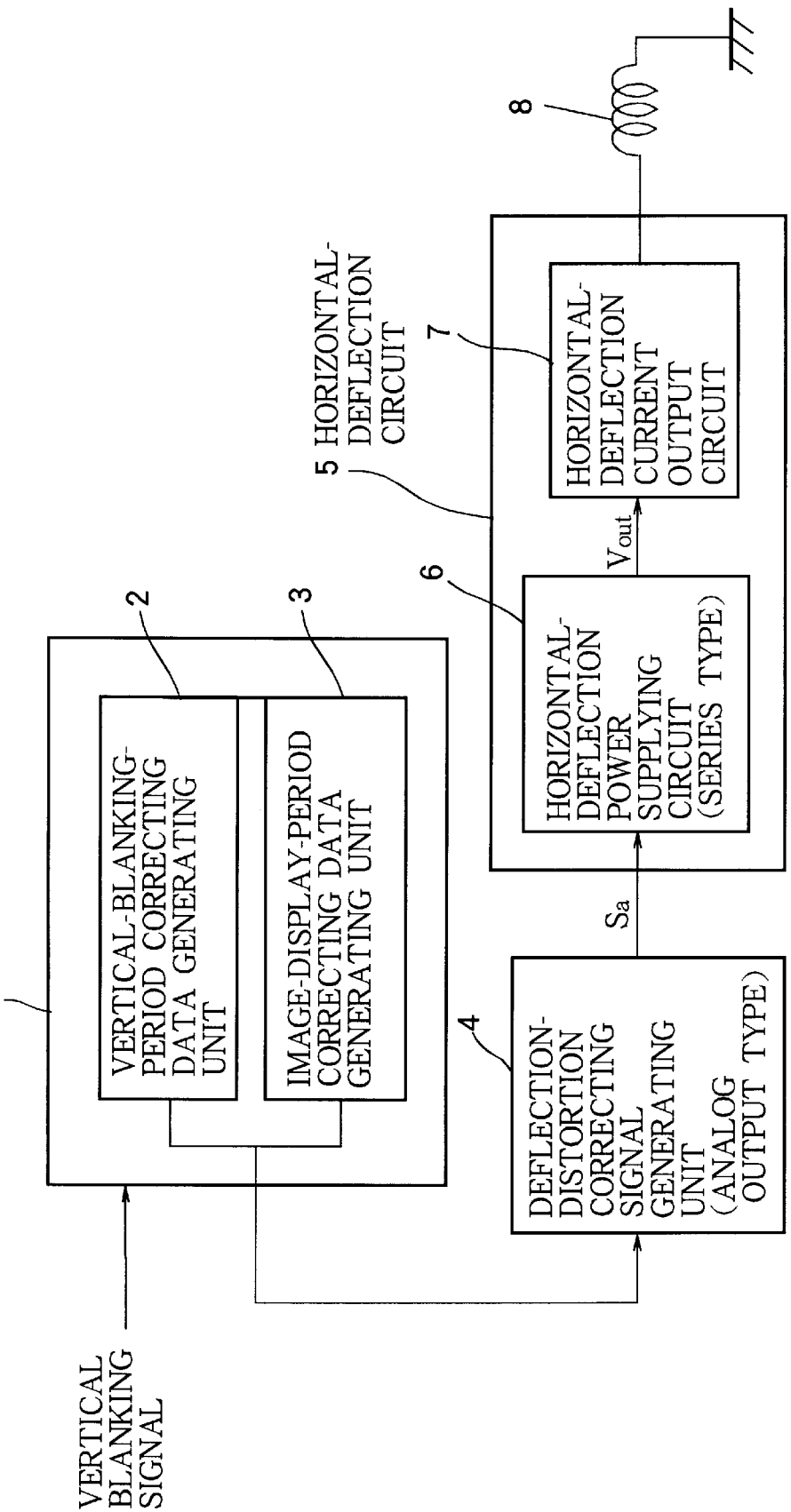
FIG. 1 is a block diagram of a first example of a deflection-distortion correcting circuit according to the present invention.

FIG. 1 is a block diagram of one example of the deflection-distortion correcting circuit according to the present invention. In FIG. 1, there is shown a digital correcting data generating unit 1, a vertical-blanking-period correcting data generating unit 2, an image-display-period correcting data generating unit 3, a deflection-distortion correcting signal generating unit 4 of the analog type, a horizontal-deflection circuit 5, a horizontal-deflection power supplying circuit 6 of the series type, a horizontal-deflection current output circuit 7, and a horizontal-deflection coil 8 are collectively arranged. As described above, the deflection-distortion correcting circuit of this example is provided with the digital correcting data generating unit 1 and the deflection-distortion correcting signal generating unit 4.

The digital correcting data generating unit 1 has the vertical-blanking-period correcting data generating unit 2 which generates a deflection-distortion correcting data (digital data) for a vertical blanking period over which no video signal exists, and the, image-display-period correcting data generating unit 3 which generates a deflection-distortion correcting data (digital data) for an image display period (including horizontal blanking periods) over which a video signal exists.

The digital correcting data generating unit 1 has a detector detecting, from an input vertical blanking signal, the start and end of an image display period (including horizontal blanking periods), and the start and end of a vertical blanking period, and notifying the vertical-blanking-period correcting data generating unit 2 and the image-display-period correcting data generating unit 3 of the results of the detection. The above-described vertical blanking signal is at a high level during an image display period and at a low level during a vertical blanking period, for example, and the digital correcting data generating unit 1 discriminates between the image display period and the vertical blanking period by detecting the level change of the vertical blanking signal.

Furthermore, the digital correcting data generating unit 1 has a gate for clocking the elapsed time, and notifies the vertical-blanking-period correcting data generating unit 2 and the image-display-period correcting data generating unit 3 of the elapsed time which has been clocked.

Furthermore, the digital correcting data generating unit 1 has an input unit inputting into the deflection-distortion correcting signal generating unit 4 the deflection-distortion correcting data output from the vertical-blanking-period correcting data generating unit 2 and inputting into the deflection-distortion correcting signal generating unit 4 the deflection-distortion correcting data output from the image-display-period correcting data generating unit 3. The above-described input unit selects one of the deflection-distortion correcting data output from the vertical-blanking-period correcting data generating unit 2 and the deflection-distortion correcting data output from the image-display-period correcting data generating unit 3, and inputs this data into the deflection-distortion correcting signal generating unit 4. Alternatively, the above-described input unit adds the deflection-distortion correcting data output from the vertical-blanking-period correcting data generating unit 2 and the deflection-distortion correcting data output from the image-display-period correcting data generating unit 3, and inputs it into the deflection-distortion correcting signal generating unit 4. In this case, the vertical-blanking-period correcting data generating unit 2 outputs a logical 0 as the deflection-distortion correcting data during an image display period, and the image-display-period correcting data generating unit 3 outputs a logical 0 as the deflection-distortion correcting data during a vertical blanking period.

The deflection-distortion correcting signal generating unit 4 generates the deflection-distortion correcting signal (analog signal) $S_a$ according to the deflection-distortion correcting data (digital data) input from the digital correcting data generating unit 1, and inputs this deflection-distortion correcting signal $S_a$ into the horizontal-deflection power supplying circuit 6 to modulate the source voltage $V_{out}$ for horizontal deflection (the voltage which the horizontal-deflection power supplying circuit 6 supplies to the horizontal-deflection current output circuit 7) by this deflection-distortion correcting signal $S_a$.

The horizontal-deflection circuit 5 has the horizontal-deflection power supplying circuit 6 of the series type and the horizontal-deflection current output circuit 7, and supplies a horizontal-deflection current to the horizontal-deflection coil 8. The horizontal-deflection power supplying circuit 6 supplies the source voltage $V_{out}$ modulated by the deflection-distortion correcting signal $S_a$ input from the deflection-distortion correcting signal generating unit 4 to the horizontal-deflection current output circuit 7. The horizontal-deflection current output circuit 7 generates a horizontal-deflection current using the modulated source voltage $V_{out}$ supplied from the horizontal-deflection power supplying circuit 6 as a circuit power, and supplies this horizontal-deflection current to the horizontal-deflection coil 8. The horizontal-deflection coil 8 generates a horizontal-deflection magnetic field according to the supplied horizontal-deflection current. The envelope characteristic of the peak values of the above-described horizontal-deflection current varies depending on the above-described modulated source voltage $V_{out}$.

Figure 2:
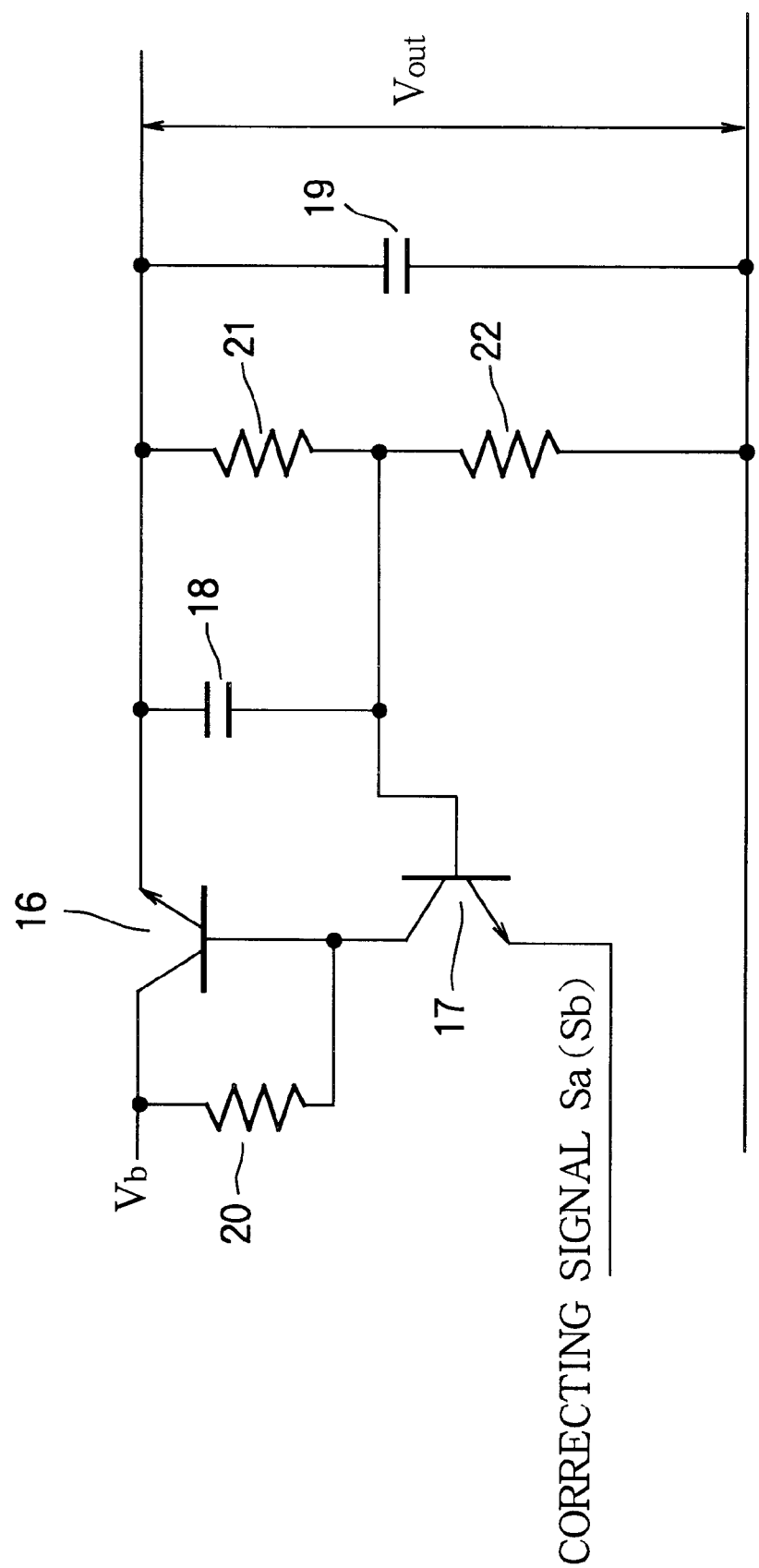
FIG. 2 is a circuit diagram of a horizontal-deflection power supplying circuit of the series type.

FIG. 2 is a circuit diagram of the horizontal-deflection power supplying circuit 6 of the series type. In FIG. 2, reference numerals 16 and 17 denote bipolar transistors, 18 and 19 denote capacitors, and 20, 21 and 22 denote resistors. $V_b$ represents a fixed voltage input into the horizontal-deflection power supplying circuit 6 from a power supplying circuit (not shown) of the image display apparatus etc., $S_a$ represents a deflection-distortion correcting signal (analog signal) input from the deflection-distortion correcting signal generating unit 4, and $V_{out}$ represents the source voltage for horizontal deflection which is modulated by the deflection-distortion correcting signal $S_a$, and is supplied to the horizontal-deflection current output circuit 7.

In the horizontal-deflection power supplying circuit 6 of FIG. 2, the fixed voltage $V_b$ is supplied to the collector electrode of the transistor 16, the base electrode of the transistor 16 is connected to the collector electrode of the transistor 17, and the source voltage $V_{out}$ to be supplied to the horizontal-deflection current output circuit 7 is produced at the emitter electrode of the transistor 16. The resistor 20 is provided between the collector electrode and the base electrode of the transistor 16. The resistors 21 and 22 and the capacitor 19 which are connected in series are provided between the emitter electrode of the transistor 16 and the ground GND. The capacitor 18 is provided between the emitter electrode of the transistor 16 and the base electrode of the transistor 17. The source voltage $V_{out}$ is divided by the resistors 21 and 22, and the resultant voltage is fed back to the base electrode of the transistor 17. The deflection-distortion correcting signal $S_a$ is input into the emitter electrode of the transistor 17. With such a structure, the source voltage $V_{out}$ varies depending on the voltage value of the deflection-distortion correcting signal $S_a$ (the source voltage $V_{out}$ increases as the voltage value of the deflection-distortion correcting signal $S_a$ increases), and the slope of the source voltage $V_{out}$ conforms to the slope of the deflection-distortion correcting signal $S_a$ and the division ratio of the resistors 21 and 22. Thus, the source voltage $V_{out}$ is modulated by the deflection-distortion correcting signal $S_a$ (or follows the voltage variation of the deflection-distortion correcting signal $S_a$). If a high frequency component caused by the abrupt voltage variation is contained in the deflection-distortion correcting signal $S_a$, the source voltage $V_{out}$ has a phase delay, reflection, ringing, etc. due to a parasitic inductance in the horizontal-deflection power supplying circuit 6. The vertical-blanking-period correcting data generating unit 2 generates deflection-distortion correcting data such that the deflection-distortion correcting signal $S_a$ has, at the start of a vertical blanking period, a value which is equal to the value at the end of an image display period, and decreases monotonously for the whole duration from the start to the end of the vertical blanking period, and reaches, at the end of the vertical blanking period, a value which is equal to its value at the start of an image display period. In this example, the vertical-blanking-period correcting data generating unit 2 generates a deflection-distortion correcting data such that the above-described deflection-distortion correcting signal $S_a$ varies linearly during a vertical blanking period. The image-display-period correcting data generating unit 3 generates deflection-distortion correcting data such that the deflection-distortion correcting signal $S_a$ increases linearly during an image display period.

As described above, the deflection-distortion correcting circuit of the present invention includes, in addition to the image-display-period correcting data generating unit 3 which generates a deflection-distortion correcting data for an image display period, the vertical-blanking-period correcting data generating unit 2 which generates a deflection-distortion correcting data for a vertical blanking period. The deflection-distortion correcting signal $S_a$ has, at the start of a vertical blanking period, a value which is equal to the value at the end of an image display period, decreases monotonously for the whole duration from the start to the end of the vertical blanking period, and reaches, at the end of the vertical blanking period, a value which is equal to the value at the start of an image display period.

The deflection-distortion correcting circuit of the first example generates a deflection-distortion correcting data by the vertical-blanking-period correcting data generating unit 2 such that the deflection-distortion correcting signal $S_a$ in a vertical blanking period varies linearly.

Furthermore, in the deflection-distortion correcting circuit of the first example, the vertical-blanking-period correcting data generating unit 2 and the image-display-period correcting data generating unit 3 are realized by a microcomputer (CPU), and deflection-distortion correcting data for a vertical blanking period and that for an image display period are generated through operation of the microcomputer. Accordingly, deflection-distortion correcting data for a vertical blanking period can be obtained easily without enlarging the hardware scale in a case where the deflection-distortion correcting circuit of the first example is realized by providing the conventional deflection-distortion correcting circuit with the vertical-blanking-period correcting data generating unit 2.

Figure 3:
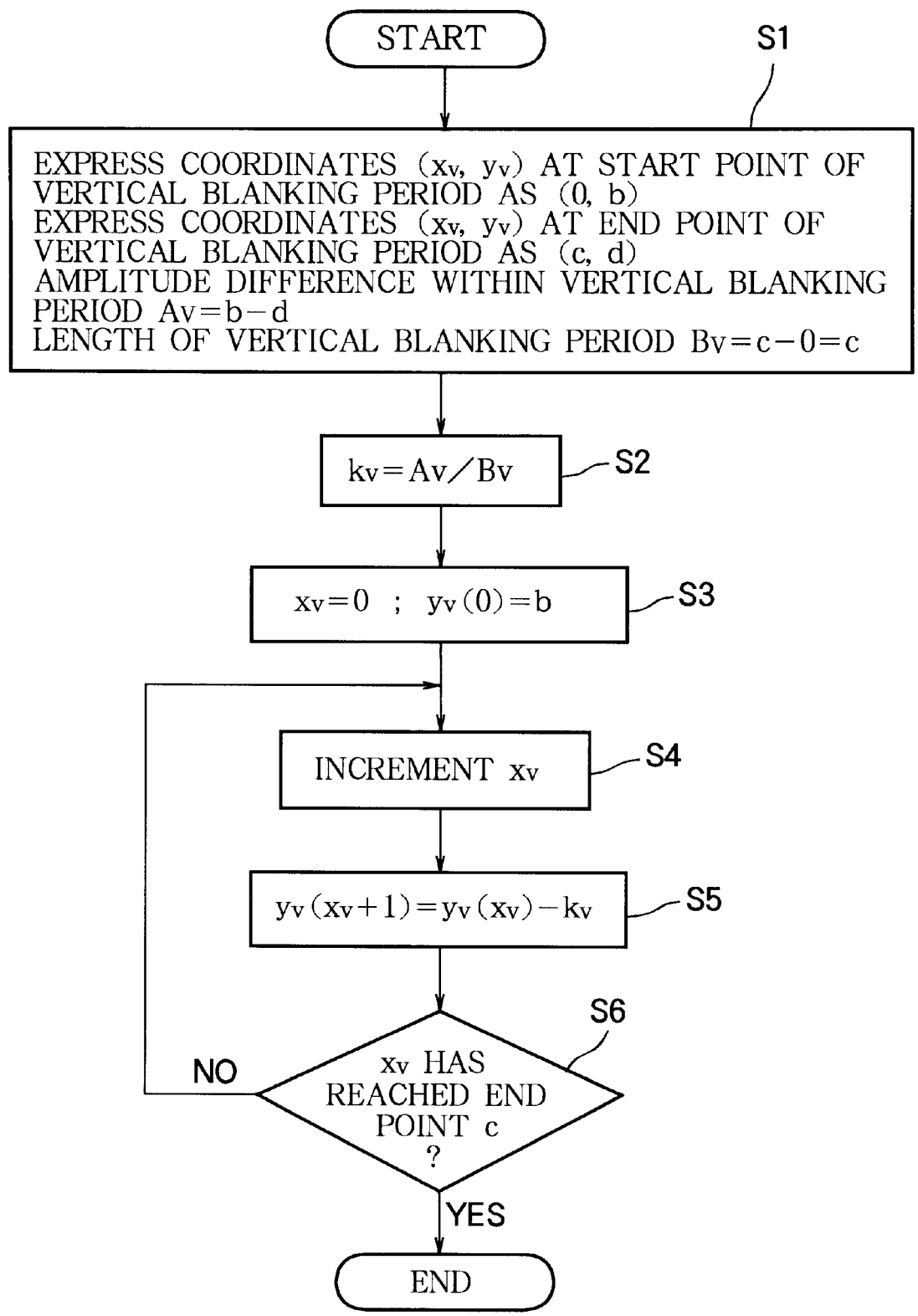
FIG. 3 is a flowchart explaining a procedure for generating a deflection-distortion correcting data by a vertical-blanking-period correcting data generating unit of the deflection-distortion correcting circuit of the first example.

The operation of the deflection-distortion correcting circuit of the first example will now be explained. FIG. 3 is a flowchart explaining a procedure for generating deflection-distortion correcting data in the vertical-blanking-period correcting data generating unit 2 of the deflection-distortion correcting circuit. FIG. 4(a) shows a pattern of deflection-distortion correcting data (digital data) generated by the digital correcting data generating unit 1. FIG. 4(b) shows the waveform of a deflection-distortion correcting signal $S_a$ (analog signal) generated by the deflection-distortion correcting signal generating unit 4 on the basis of the deflection-distortion correcting data of FIG. 4(a), and a source voltage $V_{out}$ for horizontal deflection modulated by this deflection-distortion correcting signal $S_a$. FIG. 4(c) shows a monitor screen corrected by the source voltage $V_{out}$ modulated by the deflection-distortion correcting signal $S_a$ of FIG. 4(b). In FIG. 4(a), $x_v$ represents a variable associated with the time t during a vertical blanking period, and $x_i$ represents a variable associated with the time t during an image display period. At the start of a vertical blanking period ($t=t_{vs}$), $x_v=0$, and at the start of an image display period ($t=t_{is}$), $x_i=0$. The function $y_v$ of the variable $x_v$ returns deflection-distortion correcting data for the vertical blanking period, and the function $y_i$ of the variable $x_i$ returns deflection-distortion correcting data for the image display period. Accordingly, ($x_v$, $y_v$) are coordinates of the deflection-distortion correcting data for the vertical blanking period generated by the vertical-blanking-period correcting data generating unit 2, and ($x_i$, $y_i$) are coordinates of the deflection-distortion correcting data for the image display period generated by the image-display-period correcting data generating unit 3. In FIG. 4(c), the chain line represents a monitor screen distorted to a trapezoidal shape before the correction, and the solid line represents a monitor screen after the correction.

In the following explanation of the operation, $P_v(n)$ denotes a certain vertical blanking period, and $P_v(n-1)$ denotes the preceding vertical blanking period. $P_i(n)$ denotes an image display period which starts with the end of the vertical blanking period $P_v(n)$, and $P_i(n-1)$ denotes the preceding image display period. Accordingly, the image display period $P_i(n=1)$ starts with the end of the vertical blanking period $P_v(n=1)$, the vertical blanking period $P_v(n)$ starts with the end of the image display period $P_i(n=1)$, and the image display period $P_i(n)$ starts with the end of the vertical blanking period $P_v(n)$.

The procedure for generating deflection-distortion correcting data by the vertical-blanking-period correcting data generating unit 2 will be explained first. In step S1 of FIG. 3, the coordinates $(x_v, y_v)$ of the deflection-distortion correcting data at the start point of a vertical blanking period are expressed as (0, b), and the coordinates $(x_v, y_v)$ of the deflection-distortion correcting data at the end point of the vertical blanking period are expressed as (c, d). Then, the amplitude difference $A_v$ between the start point and the end point of the vertical blanking period is expressed as b−d, and the length $B_v$ of the vertical blanking period is expressed as c−0=c. Here, c>0, b>d, the xv coordinate c at the end point is a positive integer, and the deflection-distortion correcting data value d at the end point is 0 or a positive integer. Furthermore, $x_v$=0, 1, 2, . . . , c−1, or c, and, at the start of the vertical blanking period (t=$t_{vs}$), $x_v$=0. At the end of the vertical blanking period (t=$t_{ve}$), $x_v$=c. The value $y_v$ of the deflection-distortion correcting data is represented as $y_v(0)$, $y_v(1)$, . . . , $y_v(c)$ which correspond to $x_v$=0, 1, . . . , c respectively.

Then, the slope $k_v$ of the deflection-distortion correcting data for a vertical blanking period is obtained as $k_v=A_v/B_v$ in step S2.

In step S3, the deflection-distortion correcting data value $y_v(0)$ is obtained as $y_v(0)$=b when $x_v$=0, and this value $y_v(0)$ is held. In step S4, $x_v$ is incremented by 1, and thereby $x_v$ becomes 1. In step S5, the deflection-distortion correcting data value $y_v(1)$ when $x_v$=1 is calculated by $y_v(1)=y_v(0) -k_v$, and this value $y_v(1)$ is held. In step S6, it is checked whether $x_v$ has reached the end point c. That is, it is checked whether xv=c. If $x_v$<c, it causes a return to step S4. In step S4, $x_v$ is incremented by 1 again and thereby $x_v$ becomes 2. In step S5, the deflection-distortion correcting data value $y_v(2)$ when $x_v$=2 is calculated by $y_v(2)=y_v(1)-k_v$, and this value $y_v(2)$ is held.

As described above, in steps S4 to S6, $x_v$ is incremented by one ($x_v=x_v+1$) repeatedly until $x_v$ reaches the end point c, and the deflection-distortion correcting data values $y_v(0)$(= b), $y_v(1)$, . . . , $y_v(c)$(=d) are obtained successively by calculating $y_v(x_v)=y_v(x_v-1)-k_v$ for each $x_v$ value, and these values are held. In step S6, if $x_v$=c, the procedure of FIG. 3 is terminated.

The vertical-blanking-period correcting data generating unit 2 outputs the deflection-distortion correcting data $y_v(0)$=b when the start of the vertical blanking period (t=$t_{vs}$) is detected. When t=$t_{vs}+\Delta t$, the deflection-distortion correcting data to be output is changed from $y_v(0)$ to $y_v(1)=b-k_v$. As described above, the deflection-distortion correcting data to be output is changed successively as $y_v(0)$, $y_v(1)$, . . . , $y_v(c)$ at time intervals of $\Delta t$. When the end of the vertical blanking period (t=$t_{ve}$) is detected, the delivery of the deflection-distortion correcting data is halted (for example, the deflection-distortion correcting data to be output is set to 0).

The deflection-distortion correcting data value b at the start point and the deflection-distortion correcting data value d at the end point (or the amplitude difference $A_v$ between the deflection-distortion correcting data at the start point and that at the end point), which have been explained with reference to step S1 of FIG. 3, are preset and stored in a nonvolatile memory within the vertical-blanking-period correcting data generating unit 2. It is also possible to set the deflection-distortion correcting data values b and d for each vertical blanking period.

A normal value of the x coordinate c at the end point, which has been explained with reference to step S1 of FIG. 3 (the length $B_v$ of a vertical blanking period), is preset and stored in the vertical-blanking-period correcting data generating unit 2. Alternatively, it is set for each vertical blanking period. Here, the length $T_v(=t_{ve}-t_{vs})$ of a vertical blanking period is m×$\Delta t$ (m being a positive integer), and the $x_v$ coordinate c at the end point is set to m−1. In a case where the $x_v$ coordinate c at the end point is preset, the slope $k_v$ of the deflection-distortion correcting data is calculated beforehand and stored in the vertical-blanking-period correcting data generating unit 2, while in a case where the $x_v$ Coordinate c at the end point is determined for each vertical blanking period, it is calculated for each vertical blanking period.

In a case where a normal value of the xv coordinated at the end point is preset, the deflection-distortion correcting data $y_v(0)$ . . . $y_v(c)$ calculated beforehand by the procedure of FIG. 3 are stored in a nonvolatile memory provided in the vertical-blanking-period correcting data generating unit 2. On the other hand, in a case where the $x_v$ coordinate c at the end point is set for each vertical blanking period, the deflection-distortion correcting data $y_v(0)$ . . . $y_v(c)$ are calculated by the procedure of FIG. 3 for each vertical blanking period. In the case where a normal value of the $x_v$ coordinate c at the end point is preset, it is also possible to calculate the deflection-distortion correcting data $y_v(0)$ . . . $y_v(c)$ for each vertical blanking period.

In the procedure of FIG. 3 for generating the deflection-distortion correcting data for the vertical blanking period $P_v(n)$, the slope $k_v$ needs to be calculated before the start of this vertical blanking period $P_v(n)$. Furthermore, the deflection-distortion correcting data $y_v(0)$, $y_v(1)$, $y_v(2)$, . . . , $y_v(c)$ need to be calculated before their output timings, respectively. For example, the deflection-distortion correcting data $y_v(1)$ needs to be calculated before t=$t_{vs}+\Delta t$.

In a case where the deflection-distortion correcting data $y_v(0)$ . . . $y_v(c)$ for the vertical blanking period $P_v(n)$ are calculated before the start of the vertical blanking period $P_v(n)$ (for example, at the time of turning the power on or during the image display period $P_i(n-1)$), it is necessary to hold the deflection-distortion correcting data $y_v(0)$ . . . $y_v(c)$ in a memory within the vertical-blanking-period correcting data generating unit 2. However, the calculation of the deflection-distortion correcting data $y_v(x)$ can be also carried out between t=$t_{vs}+(x_v-1) \Delta t$ and t=$t_{vs}+x_v\Delta t$, that is, during a time period over which the deflection-distortion correcting data $y_v(x_v-1)$ is output, and in this case, the memory for holding the deflection-distortion correcting data $y_v(0)$ . . . $y_v(c)$ is unnecessary.

Setting the $x_v$ coordinate c at the end point for each vertical blanking period can be carried out by the procedure described below. The digital correcting data generating unit 1 detects the start and the end of the vertical blanking period by referring to the vertical blanking signal introduced in order to set up the $x_v$ coordinate c at the end point of the vertical blanking period $P_v(n)$. Therefore, the vertical-blanking-period correcting data generating unit 2 cannot recognize the start and the end of this vertical blanking period $P_v(n)$ before the start of this vertical blanking period $P_v(n)$. For this reason, the length $T_v(n-1)$ of the preceding vertical blanking period $P_v(n-1)$ is detected during this vertical blanking period $P_v(n-1)$ and the value c of the xv coordinate of the vertical blanking period $P_v(n)$ at the end point (the length $B_v(n)$ of the vertical blanking period $P_v(n)$ is set up on the basis of this length $T_v(n-1)$ during the image display period $P_i(n-1)$, and the slope $k_v(n)$ of the vertical blanking period $P_v(n)$ is calculated on the basis of $k_v(n)=A_v/B_v(n)$, using $B_v(n)$ which has been set up on the basis of this $T_v(n-1)$.

If there is variation in the duration of the vertical blanking period $P_v(n)$, there can be a case where the deflection-distortion correcting data output when the end of the vertical blanking period is detected is $y_v(c-1)$, or a case where the deflection-distortion correcting data $y_v(c)$ is output over the period of $2 \times \Delta t$. As described above, by setting up the $x_v$ coordinate c at the end point for each vertical blanking period, it is possible to avoid such a shift of the deflection-distortion correcting data output at the end of the vertical blanking period.

The procedure for generating the deflection-distortion correcting data by the image-display-period correcting data generating unit 3 will be explained below. First, the deflection-distortion correcting data coordinates $(x_i, y_i)$ at the start point of an image display period are expressed as (0, d), and the deflection-distortion correcting data coordinates $(x_i, y_i)$ at the end point of the image display period are expressed as (e, b). Then, the amplitude difference $A_i$ between the deflection-distortion correcting data at the start point of the image display period and that at the end point of the image display period is expressed as d−b, and the length $B_i$ of the image display period is obtained as e−0=e. Here, e>0, d<b, the $x_i$ coordinate e at the end point is a positive integer, and the deflection-distortion correcting data values d and b are the same as those explained with reference to step S1 of FIG. 3. Furthermore $x_i=0, 1, 2, \ldots$, e−1, or e, and at the start of the image display period (t=$t_{is}$), $x_i=0$ and at the end of the image display period (t=$t_{ie}$), $x_i=e$. The deflection-distortion correcting data values corresponding to $x_i=0, 1, \ldots, e$ are represented by $y_i(0), y_i(1), \ldots, y_i(e)$ respectively.

Then, the slope $k_i$ of the deflection-distortion correcting data in the image display period is calculated by $k_i=A_i/B_i$.

Next, the deflection-distortion correcting data value $y_i(0)$ when $x_i=0$ is obtained by $y_i(0)=d$, and this $y_i(0)$ is held. Subsequently, $x_i$ is incremented by 1 and thereby $x_i$ becomes 1, and the deflection-distortion correcting data value $y_i(1)$ when $x_i=1$ is calculated by $y_i(1)=y_i(0)-k_i$, and this value $y_i(1)$ is held. Then, it is checked whether $x_i$ has reached the end point e. That is, it is checked whether $x_i=e$. If $x_i<e$, $x_i$ is incremented by 1 again and thereby $x_i$ becomes 2. Then, the deflection-distortion correcting data value $y_i(2)$ when $x_i=2$ is calculated by $y_i(2)=y_i(1)-k_i$, and this value $y_i(2)$ is held.

As described above, $x_i$ is incremented by one ($x_i=x_i+1$) repeatedly, and the deflection-distortion correcting data yi(0) (=b), $y_i(1), \ldots, y_i(e)$(=b) are obtained successively by calculating $y_i(x_i)=y_i (x_i-1)-k_i$ for each $x_i$ value, and are held.

The image-display-period correcting data generating unit 3 outputs the deflection-distortion correcting data $y_i(0)=d$ when the start of the image display period (t=$t_{is}$) is detected. When, t=$t_{is}+\Delta t$, the deflection-distortion correcting data being output is changed from $y_i(0)$ to $y_i(1)=d-ki$. As described above, the deflection-distortion correcting data being output is changed successively as $y_i(0)$, yi(1), ..., $y_i(e)$ at time intervals of $\Delta t$. When the end of the image display period (t=$t_{ie}$) is detected, the delivery of the deflection-distortion correcting data is halted (for example, the deflection-distortion correcting data being output is set to 0).

Over the vertical blanking period, the deflection-distortion correcting signal generation unit 4 generates a deflection-distortion correcting signal (analog signal) $S_a$ which decreases linearly according to the deflection-distortion correcting data (digital data) $y_v(0), y_v(1), \ldots, y_v(c)$ generated by the vertical-blanking-period correcting data generating unit 2 which decreases linearly at time intervals of $\Delta t$, and inputs this deflection-distortion correcting signal $S_a$ into the horizontal-deflection power supplying circuit 6. Over the image display period, the deflection-distortion correcting signal generating unit 4 generates a deflection-distortion correcting signal (analog signal) $S_a$ which increases linearly according to the deflection-distortion correcting data (digital data) $y_i(0), y_i(1), \ldots, y_i(c)$ generated by the image-display-period correcting data generating unit 3 which increases linearly at time intervals of $\Delta t$, and inputs this deflection-distortion correcting signal $S_a$ into the horizontal-deflection power supplying circuit 6.

In the horizontal-deflection power supplying circuit 6, the source voltage $V_{out}$ is modulated by the above-described deflection-distortion correcting signal $S_a$ which decreases linearly over the vertical blanking period, and increases linearly over the image display period (see FIG. 2). This modulated source voltage $V_{out}$ which decreases linearly over the vertical blanking period, and increases linearly over then image display period is supplied to the horizontal-deflection current output circuit 7. The horizontal-deflection current output circuit 7 uses the above-described modulated source voltage Vat as its electric power to generate a horizontal-deflection current whose envelope of peak values decreases linearly over the vertical blanking period, and increases linearly over then image display period, and supplies this horizontal-deflection current to the horizontal-deflection coil 8. The horizontal-deflection coil 8 generates a horizontal-deflection magnetic field according to the above-described horizontal-deflection current.

Figure 4:
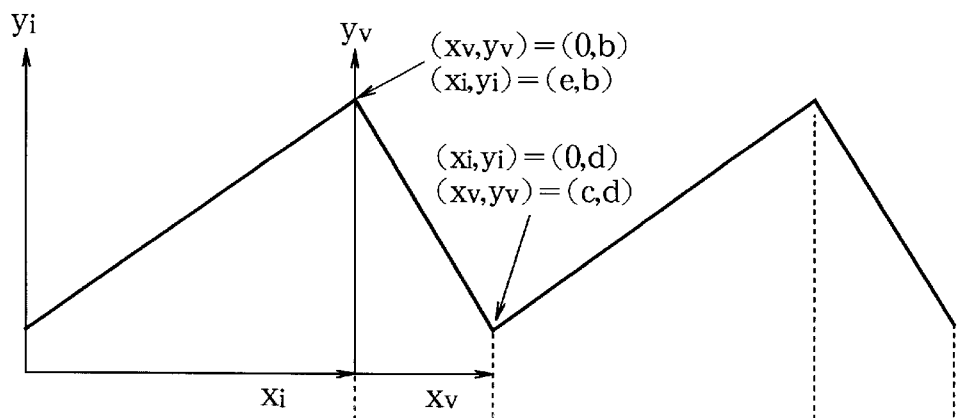
FIG. 4(a) shows a pattern of the deflection-distortion correcting data generated by the deflection-distortion correcting circuit of the first example.
FIG. 4(b) shows a waveform of the deflection-distortion correcting signal generated on the basis of this deflection-distortion correcting data and the source voltage for horizontal deflection modulated by this deflection-distortion correcting signal.
FIG. 4(c) shows a monitor screen corrected by this modulated source voltage for horizontal deflection.
Figure 4:
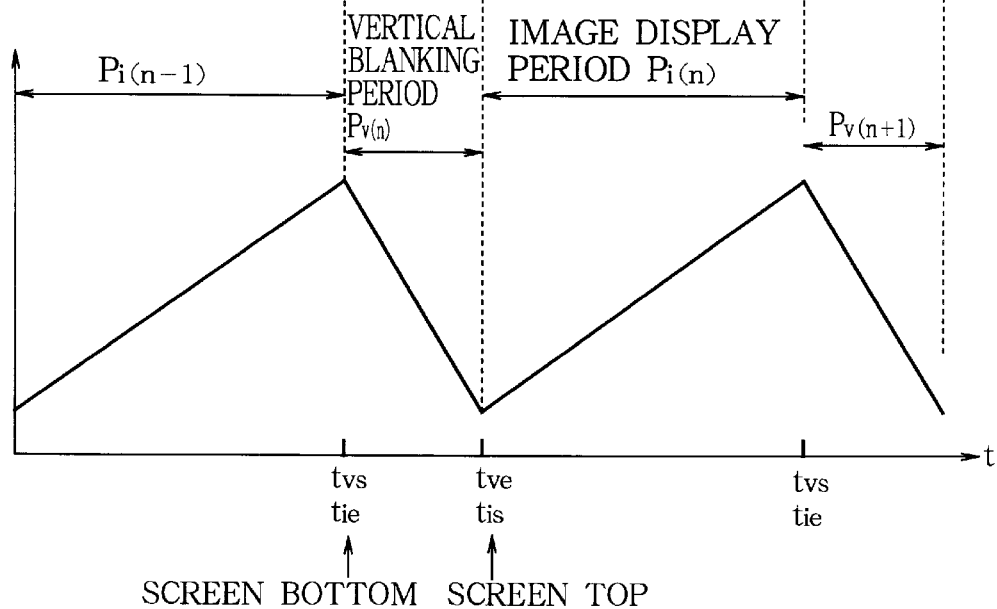
Figure 4:
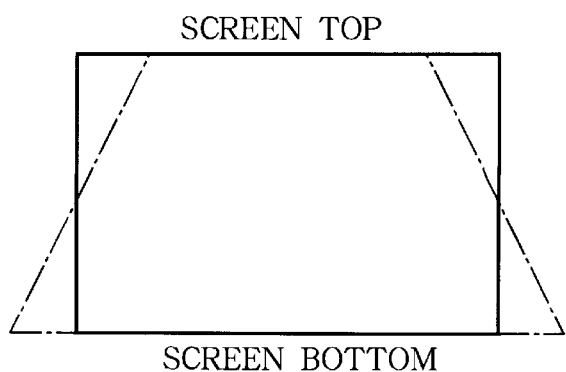

As described above, by generating deflection-distortion correcting data which decreases linearly over the vertical blanking period and increases linearly over the image display period (see FIG. 4(a)), and generating the deflection-distortion correcting signal $S_a$ on the basis of this deflection-distortion correcting data, the deflection-distortion correcting signal $S_a$ thus generated increases linearly over the image display period and decreases linearly over the vertical blanking period (see FIG. 4(b)), and therefore it does not contain a high frequency component since it does not change abruptly during the vertical blanking period unlike conventional cases. By modulating the source voltage $V_{out}$ for horizontal deflection with this deflection-distortion correcting signal $S_a$ which does not contain a high frequency component, it is possible to supply the source voltage $V_{out}$ which does not involve phase delay, reflection, ringing, etc. due to the parasitic inductance in the horizontal-deflection power supplying circuit, and which increases linearly over the image display period and decreases linearly over the vertical blanking period (see FIG. 4 (b)). By supplying this source voltage $V_{out}$ for horizontal deflection which does not involve phase delay, reflection, ringing, etc. to the horizontal-deflection current output circuit 7, such deflection-distortion as shown by the chain line in FIG. 4(c) can be corrected as shown by the solid line in FIG. 4(c) without bringing extraordinary curves and distortion to the screen.

As described above, according to the first example, the deflection-distortion correcting signal generating unit 4 of the analog output type generates the deflection-distortion correcting signal $S_a$ which decreases linearly over a vertical blanking period on the basis of the deflection-distortion correcting data for a vertical blanking period generated by the vertical-blanking-period correcting data generating unit 2, so it is possible to supply the deflection-distortion correcting signal $S_a$ which does not contain a high frequency component, which makes it possible to correct deflection-distortion normally without bringing extraordinary curves and distortion to the screen, since the source voltage $V_{out}$ for horizontal deflection modulated by this deflection-distortion correcting signal $S_a$ does not involve phase delay, reflection, ringing, etc.

Figure 5:
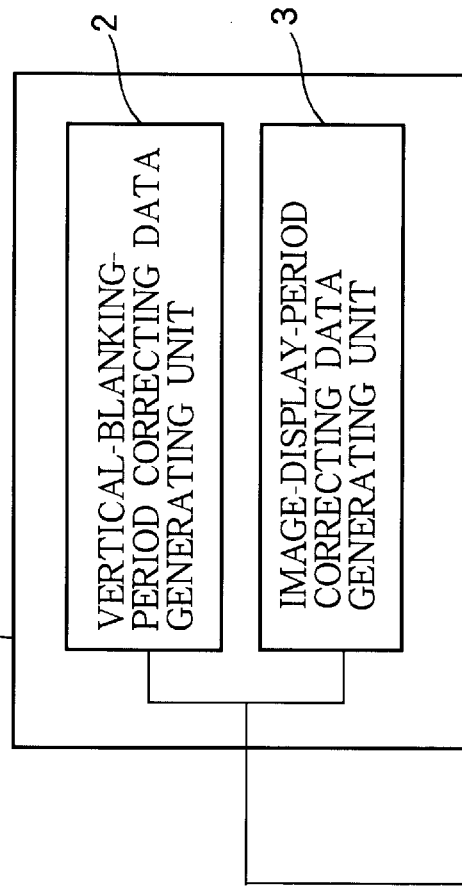
FIG. 5 is a block diagram of a second example of a deflection-distortion correcting circuit according to the present invention.
Figure 5:
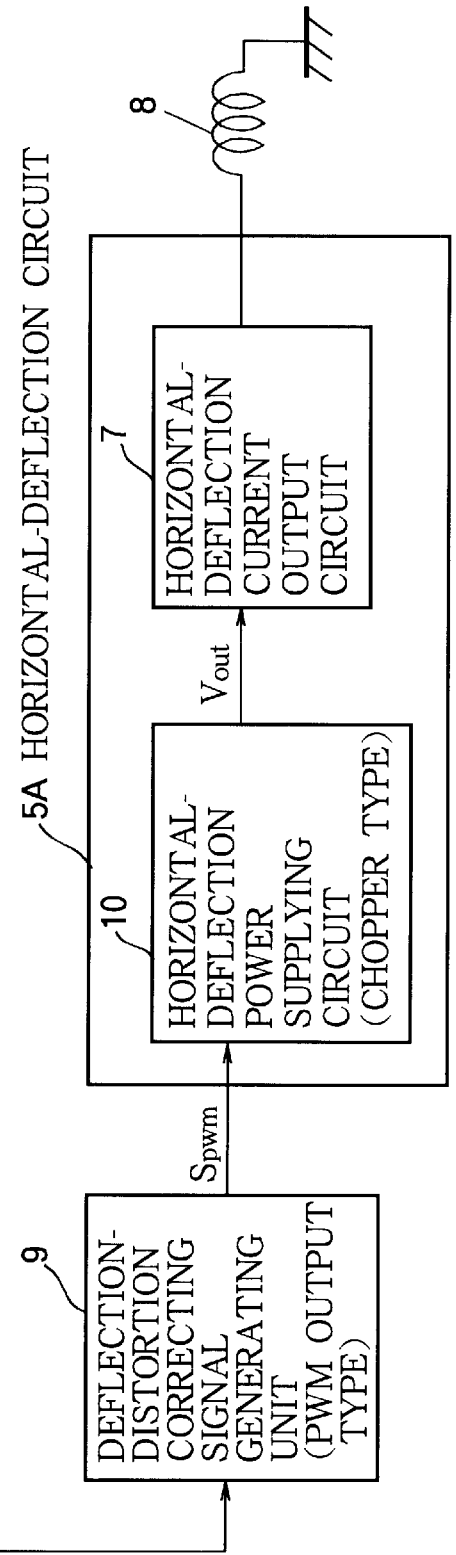

FIG. 5 is a block diagram of a second example of the deflection-distortion correcting circuit according to the present invention. In FIG. 5, the reference numerals identical to those in FIG. 1 represent the same elements. Reference numeral 5A denotes a horizontal-deflection circuit, 9 denotes a deflection-distortion correcting signal generating unit of the PWM (Pulse Width Modulation) type, and 10 denotes a horizontal-deflection power supplying circuit of the chopper type.

The deflection-distortion correcting circuit of the second example is similar to the deflection-distortion correcting circuit of the first example by replacing the deflection-distortion correcting signal generating unit 4 of the analog output type with the deflection-distortion correcting signal generating unit 9 of the PWM type, and replacing the horizontal-deflection circuit 5 with the horizontal-deflection circuit 5A. The horizontal-deflection circuit 5A can be obtained from the horizontal-deflection circuit 5 of the first example by replacing the horizontal-deflection power supplying circuit 6 of the series type with the horizontal-deflection power supplying circuit 10 of the chopper type.

The deflection-distortion correcting signal generating unit 9 generates a deflection-distortion correcting signal (PWM signal) $S_{pwm}$ on the basis of the deflection-distortion correcting data (digital data) input from the digital correcting data generating unit 1. This deflection-distortion correcting signal $S_{pwm}$ is input into the horizontal-deflection power supplying circuit 10, to modulate the source voltage $V_{out}$ for horizontal deflection by the horizontal-deflection power supplying circuit 10 with this deflection-distortion correcting signal $S_{pwm}$.

Figure 6:
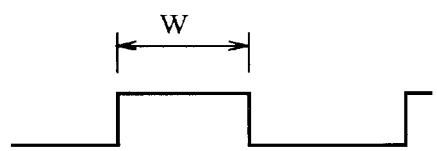
FIG. 6 shows a waveform of a deflection-distortion correcting signal (PWM signal) generated by the deflection-distortion correcting signal generating unit of the PWM output type of the deflection-distortion correcting circuit of the second example.

FIG. 6 shows a waveform of the deflection-distortion correcting signal $S_{pwm}$ (PWM signal) generated by the deflection-distortion correcting signal generating unit 9. The deflection-distortion correcting signal generating unit 9 alters a pulse width w of a high level period of the deflection-distortion correcting signal $S_{pwm}$ on the basis of the deflection-distortion correcting data (see FIG. 4(a)) input from the digital correcting data generating unit 1 to adjust the duty ratio of the deflection-distortion correcting signal $S_{pwm}$. Here, the pulse width w increases as the value of the deflection-distortion correcting data increases.

The horizontal-deflection circuit 5A including the horizontal-deflection power supplying circuit 10 of the chopper type and the horizontal-deflection current output circuit 7 supplies a horizontal-deflection current to the horizontal-deflection coil 8. That is, the horizontal-deflection power supplying circuit 10 supplies the source voltage $V_{out}$ modulated by the deflection-distortion correcting signal $S_{pwm}$ input from the deflection-distortion correcting signal generating unit 9 to the horizontal-deflection current output circuit 7. The horizontal-deflection current output circuit 7 generates a horizontal-deflection current using the modulated source voltage $V_{out}$ supplied from the horizontal-deflection power supplying circuit 10 as its electric power, and supplies this horizontal-deflection current to the horizontal-deflection coil 8. The horizontal-deflection coil 8 generates a horizontal-deflection magnetic field according to the supplied horizontal-deflection current. The envelope of the peak values of the horizontal-deflection current varies depending on the modulated source voltage $V_{out}$.

Figure 7:
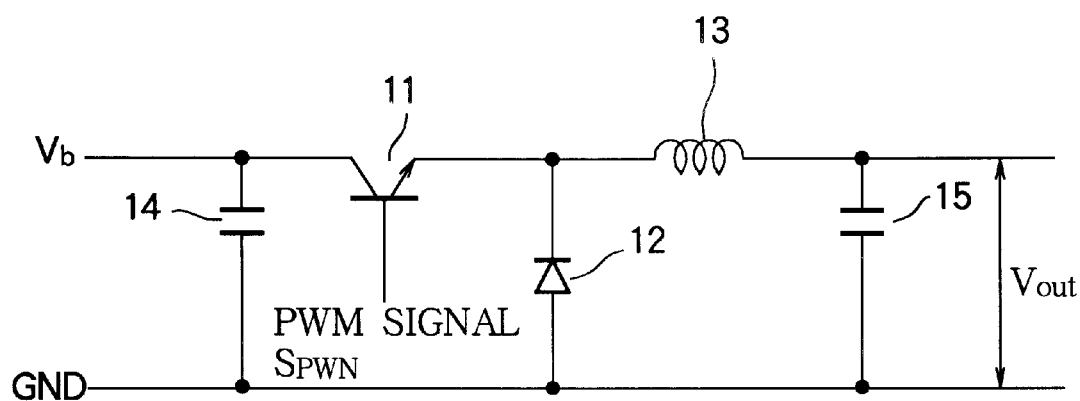
FIG. 7 is a circuit diagram of a horizontal-deflection power supplying circuit of the chopper type.

FIG. 7 is a circuit diagram of the horizontal-deflection power supplying circuit 10 of the chopper type. In FIG. 7, reference numeral 11 denotes a transistor, 12 denotes a diode, 13 denotes a coil, and 14 and 15 denote capacitors. $V_b$ represents a fixed voltage input from a power supplying circuit (not shown) and the like of the image display apparatus to the horizontal-deflection power supplying circuit 10, $S_{pwm}$ represents the deflection-distortion correcting signal (PWM signal) input from the deflection-distortion correcting signal generating unit 9, and $V_{out}$ represents a source voltage which is modulated with this deflection-distortion correcting signal $S_{pwm}$ and is supplied to the horizontal-deflection current output circuit 7.

In the horizontal-deflection power, supplying circuit 10 of FIG. 7, the fixed voltage $V_b$ is supplied to the collector electrode of the transistor 11, and the deflection-distortion correcting signal $S_{pwm}$ is input into the base electrode of the transistor 11. The emitter electrode of the transistor 11 is connected to the cathode electrode of the diode 12 and one terminal of the coil 13. The anode electrode of the diode 12 is connected to the ground GND. Between the collector electrode of the transistor 11 and the ground GND, and between another terminal of the coil 13 and the ground GND, capacitors 14 and 15 are provided respectively. The source voltage $V_{out}$ to be supplied to the horizontal-deflection current output circuit 7 is generated at another terminal of the coil 13. With such an arrangement, the transistor 11 is turned on during the high-level period of the deflection-distortion correcting signal $S_{pwm}$ (the diode 12 is turned off at this time), and turned off during the low level period of the deflection-distortion correcting signal $S_{pwm}$ (the diode 12 is turned on at this time). By this switching operation of the transistor 11, the source voltage $V_{out}$ varies depending on the variation of the width w of the high-level period of the deflection-distortion correcting signal $S_{pwm}$ (the source voltage $V_{out}$ increases as the width w of the high-level period of the deflection-distortion correcting signal $S_{pwm}$ increases). As described above, the source voltage $V_{out}$ is a voltage that is modulated by the deflection-distortion correcting signal $S_{pwm}$ or a voltage which follows the variation of the width w of the high-level period of the deflection-distortion correcting signal $S_{pwm}$.

Figure 11:
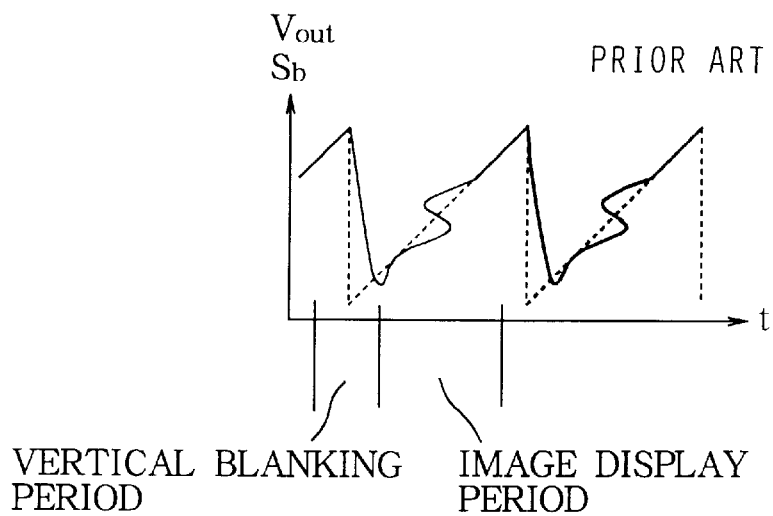
FIG. 11(a) shows a waveform of a deflection-distortion correcting signal generated by the deflection-distortion correcting circuit of FIG. 10.
FIG. 11(b) shows a waveform of a source voltage for horizontal deflection modulated by this deflection-distortion correcting signal.
FIG. 11(c) shows a monitor screen corrected by this source voltage for horizontal deflection.
Figure 11:
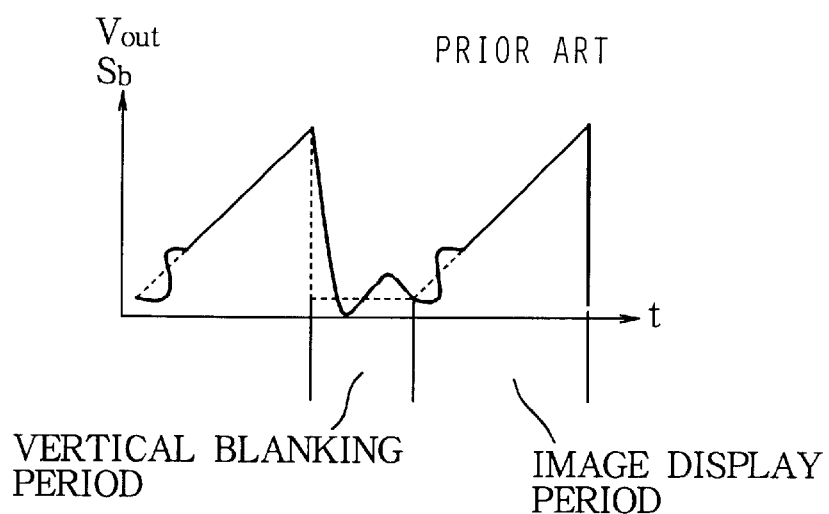
Figure 11:
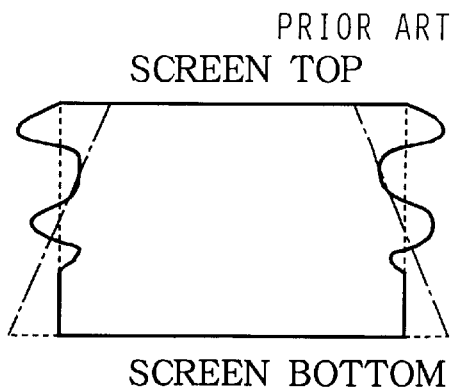
Figure 12:
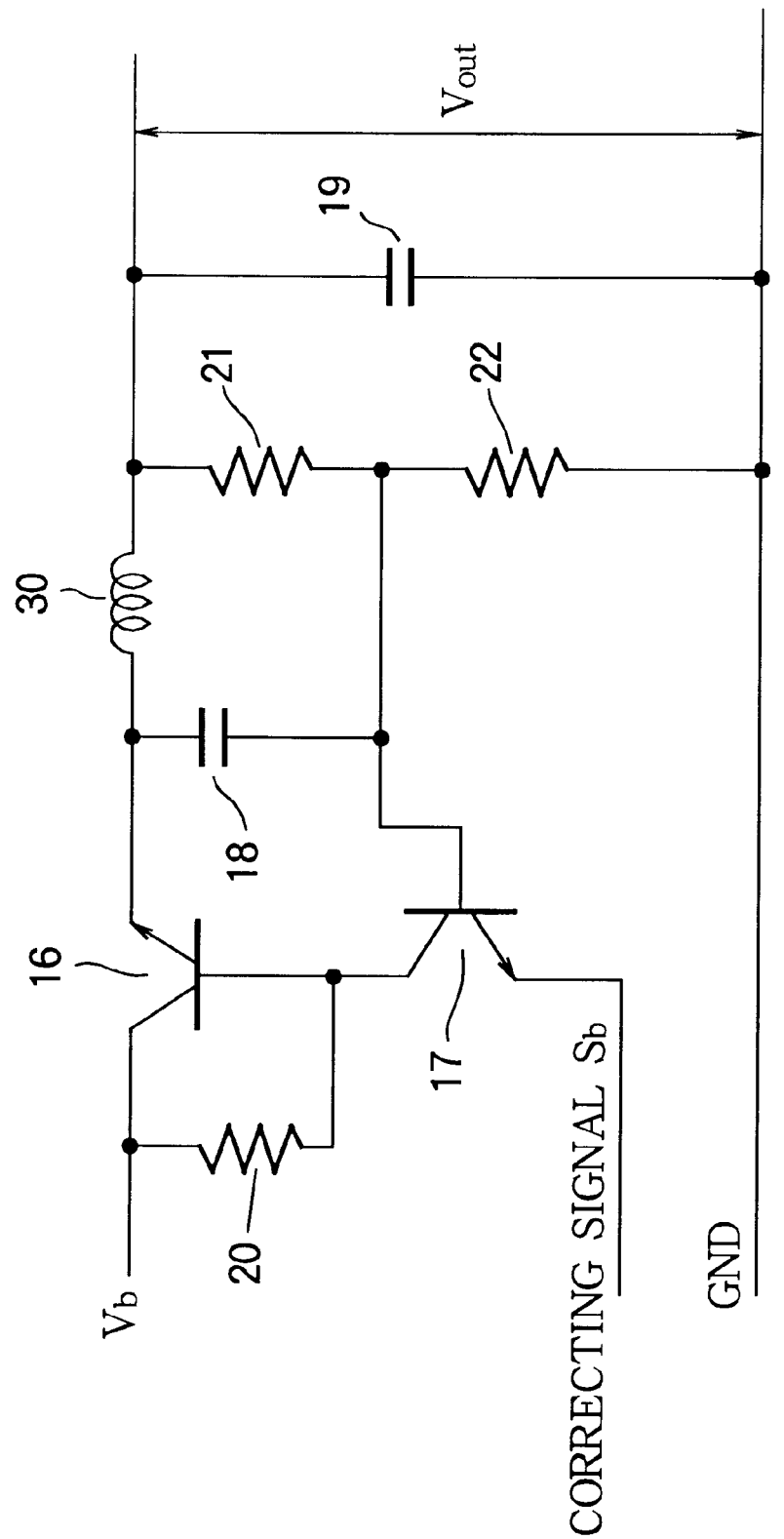
FIG. 12 is an equivalent-circuit diagram of the horizontal-deflection power supplying circuit of the series type when a considerable parasitic inductance exists.

The coil 13 of the horizontal-deflection power supplying circuit 10 in FIG. 7 has a much larger inductance than the parasitic inductance 30 in FIG. 12. Therefore, if the deflection-distortion correcting signal (PWM signal) whose pulse width w of the high level period changes from the maximum value to the minimum value abruptly in a vertical blanking period, which is comparable to the conventional deflection-distortion correcting signal whose voltage changes from the maximum value to the minimum value abruptly in a vertical blanking period (see FIG. 11(a) and (b)), is input to the horizontal-deflection power supplying circuit 10, the source voltage $V_{out}$ will have phase delay, reflection, ringing, etc. due to the LC coupling of the coil 13 and the capacitor 15, which are much larger than those that will appear if the above-described conventional deflection-distortion correcting signal is input into the horizontal-deflection power supplying circuit 6 of the series type (see FIG. 2 and FIG. 12), so that conspicuous curves and distortion will appear on the display screen.

Accordingly, deflection-distortion correcting data which increases linearly over an image display period and decreases linearly over a vertical blanking period (see FIG. 4(a)) is generated, and the deflection-distortion correcting signal $S_{pwm}$ is generated on the basis of this deflection-distortion correcting data, so that the deflection-distortion correcting signal $S_{pwm}$ thus generated becomes a signal whose pulse width w of the high level period increases linearly over an image display period, and decreases linearly over a vertical blanking period. By modulating the source voltage $V_{out}$ with this deflection-distortion correcting signal $S_{pwm}$, it is possible to produce the source voltage $V_{out}$ for horizontal deflection which has reduced phase delay, reflection, ringing, etc., and increases linearly over an image display period and decreases linearly over a vertical blanking period. By supplying this source voltage $V_{out}$ having reduced phase delay, reflection, ringing, etc. to the horizontal-deflection current output circuit 7, the screen can be corrected for deflection-distortion normally without bringing extraordinary curves and distortion to the screen.

As described above, according to the second example in which the deflection-distortion correcting signal generating unit 9 of the PWM output type generates the deflection-distortion correcting signal $S_{pwm}$ whose pulse width w decreases linearly over a vertical blanking period on the basis of the deflection-distortion correcting data for a vertical blanking period generated by the vertical-blanking-period correcting data generating unit 2, and the source voltage $V_{out}$ for horizontal deflection is modulated by this deflection-distortion correcting signal $S_{pwm}$, it is possible to correct deflection-distortion normally without bringing extraordinary curves and distortion to the screen.

The deflection-distortion correcting circuit of a third example according to the present invention differs from the deflection-distortion correcting circuit of the first example in that the vertical-blanking-period correcting data generating unit 2 is modified to generate a deflection-distortion correcting data such that the deflection-distortion correcting signal $S_a$ varies along a monotonously decreasing curve of a second order or higher over a vertical blanking period.

Figure 8:
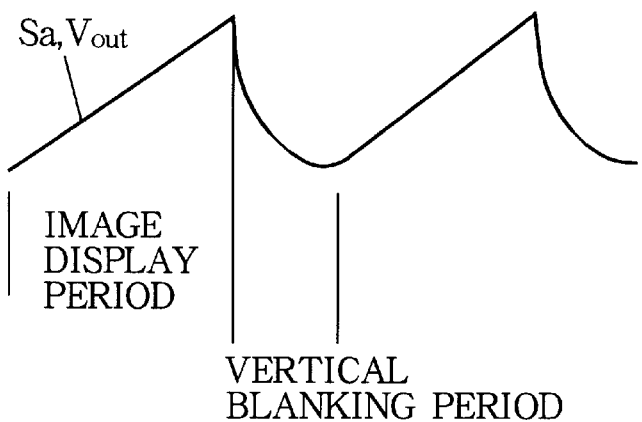
FIG. 8 shows a waveform of a deflection-distortion correcting signal generated by a deflection-distortion correcting signal generating unit of a deflection-distortion correcting circuit of a third example according to the present invention and a source voltage for horizontal deflection modulated by this deflection-distortion correcting signal.

FIG. 8 shows a waveform of the deflection-distortion correcting signal $S_a$ generated by the deflection-distortion correcting signal generating unit 4 (see FIG. 1) of the deflection-distortion correcting circuit of this example, and the source voltage $V_{out}$ for horizontal deflection modulated by this deflection-distortion correcting signal $S_a$ by the horizontal-deflection power supplying circuit 6 (see FIG. 1).

As in the case of the first example, where the deflection-distortion correcting signal $S_a$ varies along a monotonously decreasing curve of a second order or higher over a vertical blanking period as shown in FIG. 8, it is possible to correct the deflection-distortion of a screen normally without bringing extraordinary curves and distortion to the screen.

As described above, in the present example where the deflection-distortion correcting signal $S_a$, which varies along a monotonously decreasing curve of a second order or higher over a vertical blanking period is generated by the vertical-blanking-period correcting data generating unit 2 and the deflection-distortion correcting signal generating unit 4, and the source voltage $V_{out}$ for horizontal deflection is modulated with this deflection-distortion correcting signal $S_a$, it is possible to correct the deflection-distortion of a screen normally without bringing extraordinary curves and distortion to the screen as in the case of the first example.

In the third example, although the deflection-distortion correcting signal $S_a$ varies along a monotonously decreasing curve of a second order or higher over a vertical-blanking period, the signal $S_a$ may also vary along a monotonously decreasing curve of a third order or higher over a vertical blanking period. In such a case, as well as in the first example, it is possible to correct the deflection-distortion of a screen normally without bringing extraordinary curves and distortion to the screen.

The deflection-distortion correcting circuit of a fourth example differs from the deflection-distortion correcting circuit of the first example in that the image-display-period correcting data generating unit 3 generates the deflection-distortion correcting data such that the deflection-distortion correcting signal $S_a$ is also a signal for correcting side-pin distortion (side-pin corner distortion) during an image display period.

Figure 9:
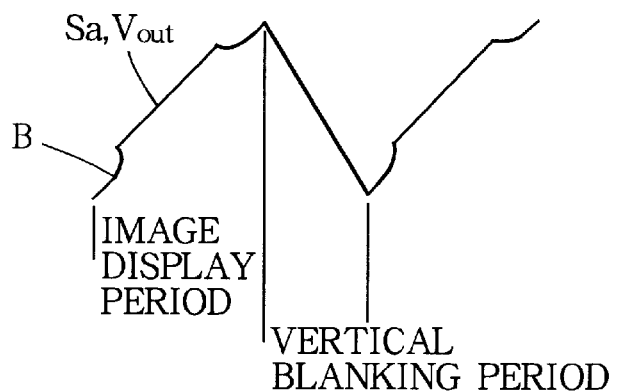
FIG. 9(a) shows a waveform of a deflection-distortion correcting signal generated by a deflection-distortion correcting circuit of a fourth example according to the present invention and a source voltage for horizontal deflection modulated by this deflection-distortion correcting signal.
FIG. 9(b) shows a monitor screen corrected by this source voltage for horizontal deflection.
Figure 9:
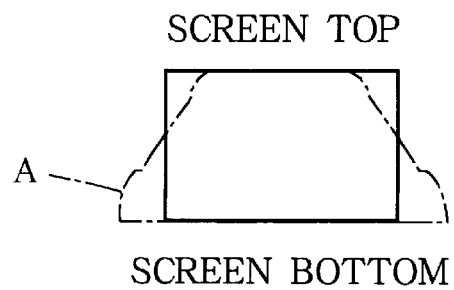
Figure 10:
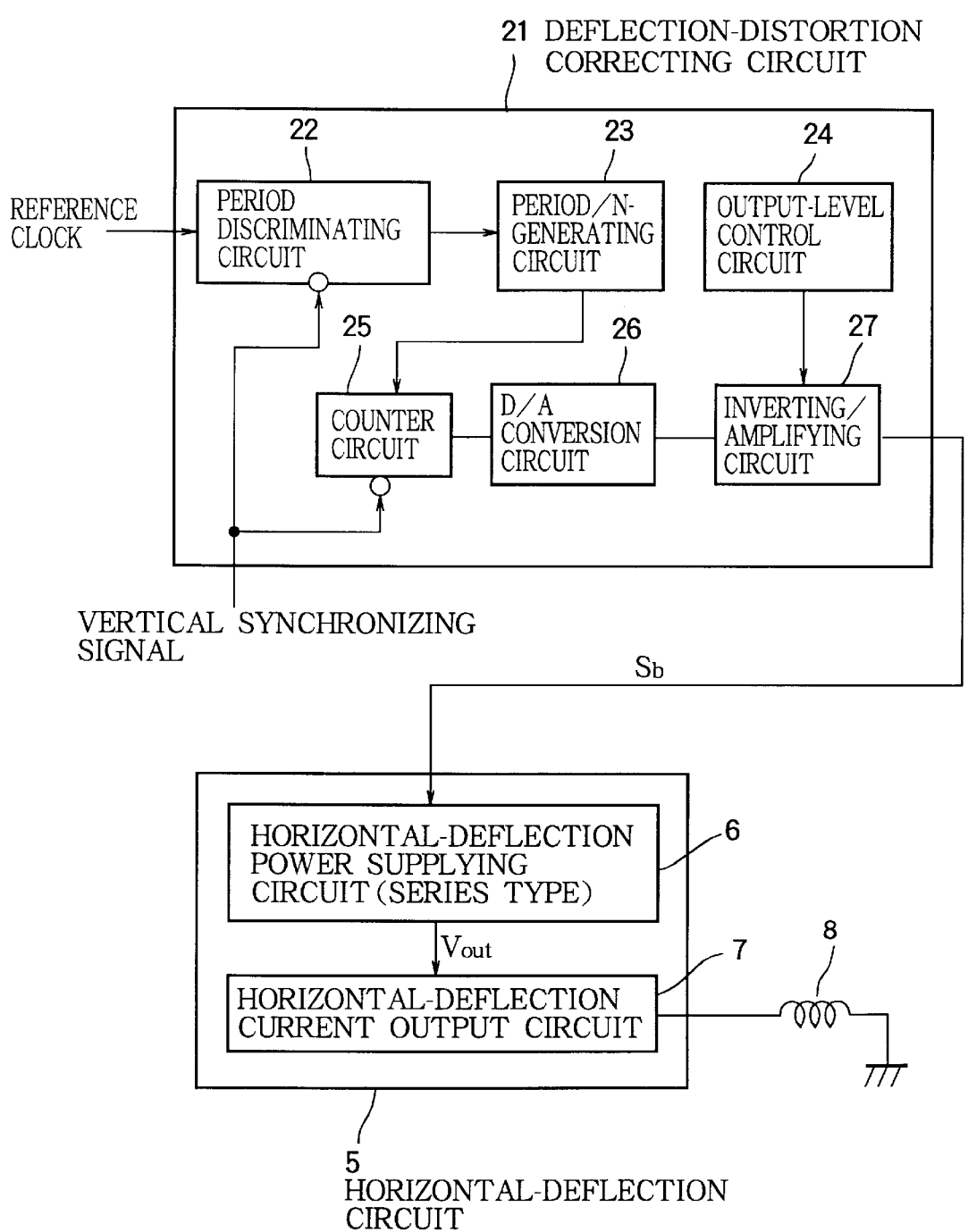
FIG. 10 is a block diagram of a conventional deflection-distortion correcting circuit.

FIG. 9(a) shows a waveform of the deflection-distortion correcting signal $S_a$ generated by the deflection-distortion correcting signal generating unit 4 (see FIG. 1) of this example, and the source voltage $V_{out}$ for horizontal deflection modulated with this deflection-distortion correcting signal $S_a$. FIG. 9(b) shows a monitor screen corrected by the source voltage $V_{out}$ for horizontal deflection modulated by this deflection-distortion correcting signal $S_a$ shown in FIG. 9(a). In FIG. 9(b), A represents side-pin distortion, the chain line represents a monitor screen having a trapezoidal distortion and the side-pin distortion A before correction, and the solid line represents a monitor screen after correction for the trapezoidal distortion and the side-pin distortion A. In FIG. 9(a), B represents a recess provided in the deflection-distortion correcting signal $S_a$ for an image display period in order to correct the side-pin distortion A. This recess B is provided also in the source voltage $V_{out}$ for an image display period.

As described above, by generating the deflection-distortion correcting signal $S_a$ (see FIG. 9(a)) which decreases linearly over a vertical blanking period and has the recess B for correcting the side-pin distortion A during an image display period, and by modulating the source voltage $V_{out}$ for horizontal deflection with this correcting signal $S_a$, it is possible to produce the source voltage $V_{out}$ which does not include phase delay, reflection, ringing, etc. The trapezoidal distortion and the side-pin distortion A of the screen shown by the chain line in FIG. 9(b) can be normally corrected as shown by the solid line in FIG. 9(b) without bringing extraordinary curves and distortion to the screen by supplying this source voltage $V_{out}$ to the horizontal-deflection current output circuit 7.

As described above, according to this example in which the deflection-distortion correcting signal $S_a$ is generated so as to decrease linearly over a vertical blanking period on the basis of the deflection-distortion correcting data generated by the vertical-blanking-period correcting data generating unit 2 and to have the recess for correcting the side-pin distortion during an image display period on the basis of the deflection-distortion correcting data generated by the image-display-period correcting data generating unit 3, and the source voltage $V_{out}$ for horizontal deflection is modulated with this deflection-distortion correcting signal $S_a$, it is possible to correct the trapezoidal distortion and the side-pin distortion normally without bringing extraordinary curves and distortion to the screen.

The above explained preferred embodiments are exemplary of the invention of the present application which is described solely by the claims appended below. It should be understood that modifications of the preferred embodiments may be made as would occur to one of skill in the art.

What is claimed is:

1. A deflection-distortion correcting circuit for correcting deflection-distortion of an image by modulating a source voltage for horizontal deflection, said deflection-distortion correcting circuit comprising:
    a first correcting data generator for generating a first correcting data for an image display period;
    a second correcting data generator for generating a second correcting data for a vertical blanking period;
    a deflection-distortion correcting signal generator for generating a correcting signal for said image display period and said vertical blanking period in accordance with said first and second correcting data; and
    a modulator modulating said source voltage with said correcting signal,
    wherein, said second correcting data generator generates said second correcting data such that said correcting signal has a value, at a start of a vertical blanking period, which is equal to a value of said correcting signal at an end of an image display period, said correcting signal varying monotonically during the whole period of the vertical blanking period, reaching at an end of the vertical blanking period, a value at a start of the image display period.

2. A deflection-distortion correcting circuit according to claim 1, in which said second correcting data generator generates said second correcting data such that said correcting signal varies linearly over the vertical blanking period.

3. A deflection-distortion correcting circuit according to claim 1, in which said second correcting data generator generates said second correcting data such that said correcting signal varies along a monotonously decreasing or increasing curve of a second order or higher over the vertical blanking period.

4. A deflection-distortion correcting circuit according to claim 1, in which said first correcting data generator generates said first correcting data such that said correction signal is also a signal for correcting side-pin distortion of an image during the image display period.

5. A deflection-distortion correcting circuit according to claim 1, in which said second correcting data generator is constituted by a microcomputer, and said second correcting data for the vertical blanking period being produced by an operation in said microcomputer.

* * * * *